United States Patent
Saldana et al.

(10) Patent No.: US 10,643,126 B2
(45) Date of Patent: May 5, 2020

(54) SYSTEMS, METHODS AND DEVICES FOR DATA QUANTIZATION

(71) Applicant: Huawei Technologies Co., Ltd., Shenzhen (CN)

(72) Inventors: Manuel Saldana, Toronto (CA); Barnaby Dalton, Mississauga (CA); Vanessa Courville, Etobicoke (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 900 days.

(21) Appl. No.: 15/210,164

(22) Filed: Jul. 14, 2016

(65) Prior Publication Data

US 2018/0018560 A1 Jan. 18, 2018

(51) Int. Cl.
*G06N 3/08* (2006.01)
*G06N 3/063* (2006.01)
*G06F 3/06* (2006.01)
*G06N 3/04* (2006.01)

(52) U.S. Cl.
CPC .............. *G06N 3/08* (2013.01); *G06F 3/067* (2013.01); *G06F 3/0613* (2013.01); *G06F 3/0625* (2013.01); *G06F 3/0659* (2013.01); *G06N 3/0472* (2013.01); *G06N 3/063* (2013.01)

(58) Field of Classification Search
None
See application file for complete search history.

(56) References Cited

U.S. PATENT DOCUMENTS

| 2012/0072207 | A1  | 3/2012 | Morii |             |
|--------------|-----|--------|-------|-------------|
| 2016/0086078 | A1* | 3/2016 | Ji    | G06K 9/6267 |
|              |     |        |       | 382/157     |
| 2018/0046894 | A1* | 2/2018 | Yao   | G06F 7/483  |
| 2018/0082181 | A1* | 3/2018 | Brothers | G06N 3/082 |

FOREIGN PATENT DOCUMENTS

| CN | 1905675 A   | 1/2007  |
|----|-------------|---------|
| CN | 101330291 A | 12/2008 |
| CN | 102033964 A | 4/2011  |

OTHER PUBLICATIONS

Gong, Yunchao, et al. "Compressing deep convolutional networks using vector quantization." arXiv preprint arXiv:1412.6115 (2014). (Year: 2014).*

(Continued)

*Primary Examiner* — Eric Nilsson
(74) *Attorney, Agent, or Firm* — Slater Matsil, LLP (57) ABSTRACT

A memory control unit for handling data stored in a memory device includes a first interface to an interconnection with at least one memory bank; a second interface for communicating with a data requesting unit; and a memory quantization unit. The memory quantization unit is configured to: obtain, via the first interface, a first weight value from the at least one memory bank; quantize the first weight value to generate at least one quantized weight value having a shorter bit length than a bit length of the first weight value; and communicate the at least one quantized weight value to the data requesting unit via the second interface.

21 Claims, 8 Drawing Sheets

(56) References Cited

OTHER PUBLICATIONS

Han, Song, Huizi Mao, and William J. Dally. "Deep compression: Compressing deep neural networks with pruning, trained quantization and huffman coding." arXiv preprint arXiv:1510.00149 (2016). (Year: 2016).*

Merolla, Paul, et al. "Deep neural networks are robust to weight binarization and other non-linear distortions." arXiv preprint arXiv:1606.01981 (2016). (Year: 2016).*

Kim, Duckhwan, et al. "Neurocube: A programmable digital neuromorphic architecture with high-density 3D memory." 2016 ACM/IEEE 43rd Annual International Symposium on Computer Architecture (ISCA). IEEE, 2016. (Year: 2016).*

Feng, Gan, et al. "Energy-efficient and high-throughput FPGA-based accelerator for Convolutional Neural Networks." 2016 13th IEEE International Conference on Solid-State and Integrated Circuit Technology (ICSICT). IEEE, 2016. (Year: 2016).*

Courbariaux, Mattieu, et al., "BinaryConnect: Training Deep Neural Networks with binary weights during propagations", Advances in Neural Information Processing Systems 28 (NIPS 2015), Dec. 7-12, 2015.

\* cited by examiner

```
┌─────────────────────────┐
│ Obtain a first weight from a │
│     memory device       │
│          710            │
└─────────────────────────┘
            │
            ▼
┌─────────────────────────┐
│ Quantize first weight value, at │
│ memory quantization unit, to │
│ generate quantized weight │
│        value(s)         │
│          720            │
└─────────────────────────┘
            │
            ▼
┌─────────────────────────┐
│ Communicate quantized weight │
│ value(s) to data requesting unit │
│          730            │
└─────────────────────────┘
```

SYSTEMS, METHODS AND DEVICES FOR DATA QUANTIZATION

FIELD

Embodiments described herein relate generally to memory devices, and in particular, some embodiments relate to systems, devices and methods for utilizing data stored in memory.

BACKGROUND

In some data-intensive applications, large volumes of data may be accessed from memory. The accessing of large amounts data stored in memory may be a bottleneck in a process, and in some instances may be limited by the bandwidth between a memory device and a computational unit.

For example, deep neural networks (DNNs) may include many data processing layers each consisting of numerous nodes. Training of a DNN may involve applying node weights stored in memory to potentially hundreds of thousands of training data sets. For these and other data applications, it would be beneficial to utilize data values stored in memory efficiently.

These drawings depict example embodiments for illustrative purposes, and variations, alternative configurations, alternative components and modifications may be made to these example embodiments.

SUMMARY

In an aspect, there is provided a memory control unit including: a first interface to an interconnection with at least one memory bank; a second interface for communicating with a data requesting unit; and a memory quantization unit. The memory quantization unit is configured to: obtain, via the first interface, a first weight value from the at least one memory bank; quantize the first weight value to generate at least one quantized weight value having a shorter bit length than a bit length of the first weight value; and communicate the at least one quantized weight value to the data requesting unit via the second interface.

In another aspect, there is provided a method for quantizing data stored in a memory device. The method includes: upon receiving, at a memory control unit, a quantized data request, obtaining a first weight value from the memory device; quantizing, with a memory quantization unit, the first weight value to generate at least one quantized weight value having a shorter bit length than a bit length of the first weight value; and communicating the at least one quantized weight value to a data requesting unit.

In another aspect, there is provided a circuit including: a memory control unit having a first interface to an interconnection with at least one memory bank; a second interface for communicating with a data requesting unit; and a memory quantization unit. The memory quantization unit configured to: obtain, via the first interface, a first weight value from the at least one memory bank; quantize the first weight value to generate at least one quantized weight value having a shorter bit length than a bit length of the first weight value; and communicate the at least one quantized weight value to the data requesting unit via the second interface

DETAILED DESCRIPTION

For data-intensive application, hardware constraints on accessing data from memory can be an important consideration in the design or operation of a data process. Accessing large amounts data stored in memory may be a bottleneck in a process, and in some instances may be limited by the bandwidth between a memory device and a unit requesting the data such as a computational unit. In some applications, the size and utilization of the available memory can also be a consideration for data-heavy applications.

In some embodiments, aspects of the present disclosure may reduce memory storage requirements and/or may reduce memory bandwidth requirements for certain data processing applications.

In the field of machine learning, artificial neural networks are computing structures which use sets of labelled (i.e. pre-classified) data to 'learn' their defining features. Once trained, the neural network architecture may then be able to classify new input data which has not been labeled. This training process and other aspects of neural networks can involve processing large amounts of data.

Figure 1:
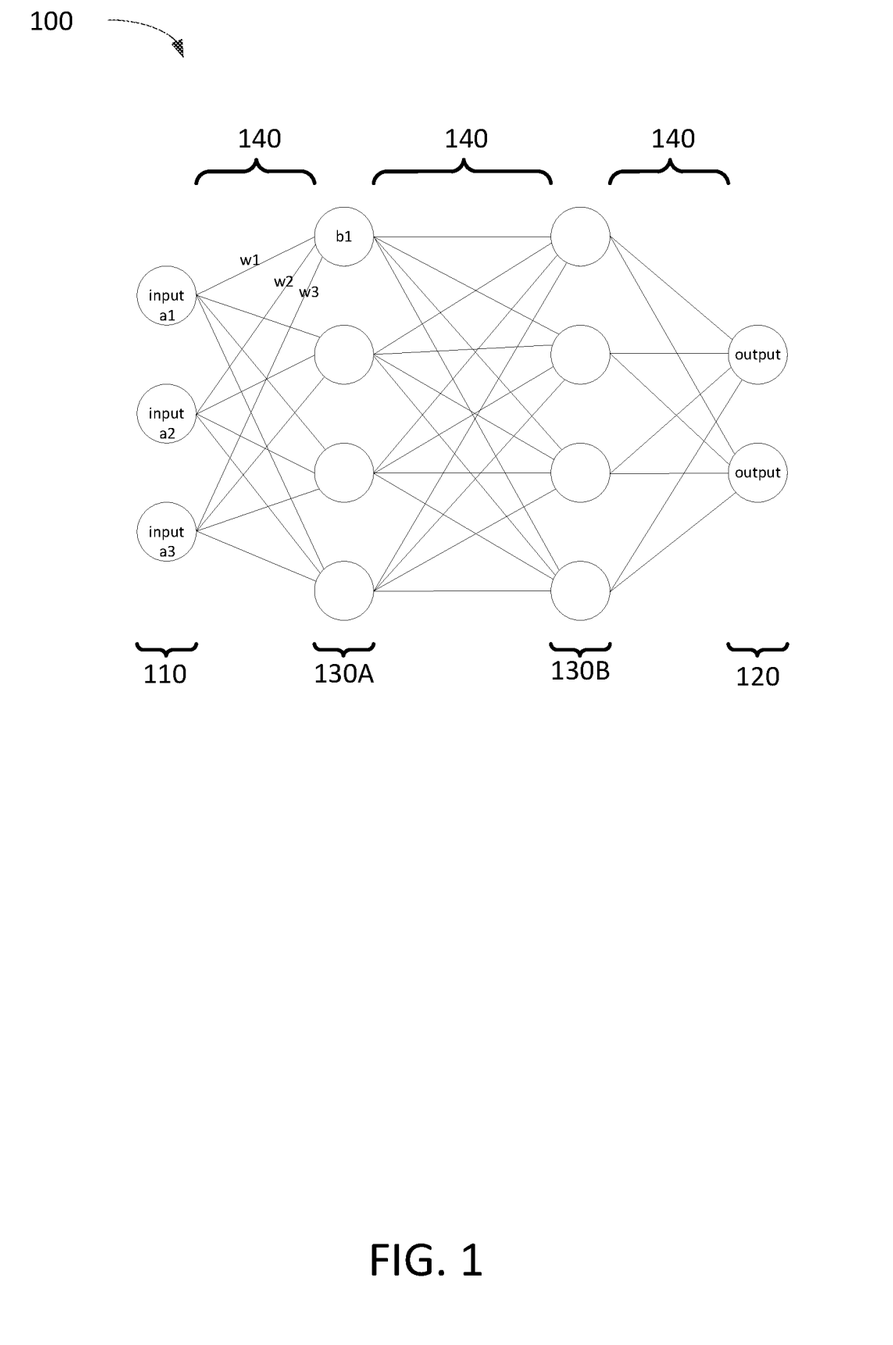
FIG. 1 is a schematic view showing aspects of an example neural network architecture.

FIG. 1 shows an example deep neural network architecture 100. A deep neural network (DNN) can be modelled as two or more artificial neural network layers 130A, 130B between input 110 and output 120 layers. Each layer can include a number of nodes with interconnections 140 to nodes of other layers and interconnections' corresponding weights. The outputs of the deep neural network can be computed by a series of matrix functions as the input data values propagate through the various nodes and weighted interconnects. In some examples, deep neural networks include a cascade of artificial neural network layers for computing various machine learning algorithms on a data set.

To calculate an intermediate value at a node in the DNN, the neural network sums the values of the previous layer multiplied by the weights of the corresponding interconnections. For example, in FIG. 1, the value at node b1 is $a1*w1+a2*w2+a3*w3$. When the interconnect weights are real numbers, computing values in the neural network can involve many multiplications and accumulations that can require a large amount of hardware resources (e.g. chip area, computation units, power consumption, etc.).

Training a neural network can involve processing tens to hundreds of thousands of input sets through the neural network and incrementally updating the interconnect weights. Retrieving interconnect weights from memory in order to process the large number of input sets can be a significant aspect of the training process. Therefore, neural network architecture designs and operations which handle memory access requests efficiently may reduce the training time to train a neural network.

In some embodiments, data processes described herein may quantize values stored in memory to lower resolution or lower precision data. For example, for a neural network process, an interconnect weight may be quantized into one of two values (binary values) or into one of three values (ternary values).

By reducing the bit length of a data value, the computational circuits or processes required by a neural network or other application can be reduced. For example, quantizing a 32 or 64-bit number into a 2 or 4-bit number can significantly reduce the size and cost of a multiplier circuit. Quantizing a data value into a single bit can reduce a multiply-accumulate function into an addition or subtraction which is much less costly in terms of size, complexity and energy consumption.

Quantizing an original data value into a quantized data value can inherently result in a loss of information. In some embodiments, compensating for this loss of information can be performed by quantizing the original data value each time it is requested. The quantization of the original data value is performed such that by averaging over a large number of quantizations, the results converge towards the same result as would have been provided by the original data value.

In some instances, the manner in which original data values are accessed from memory to be quantized may affect the performance of an application using this quantization process.

Figure 2:
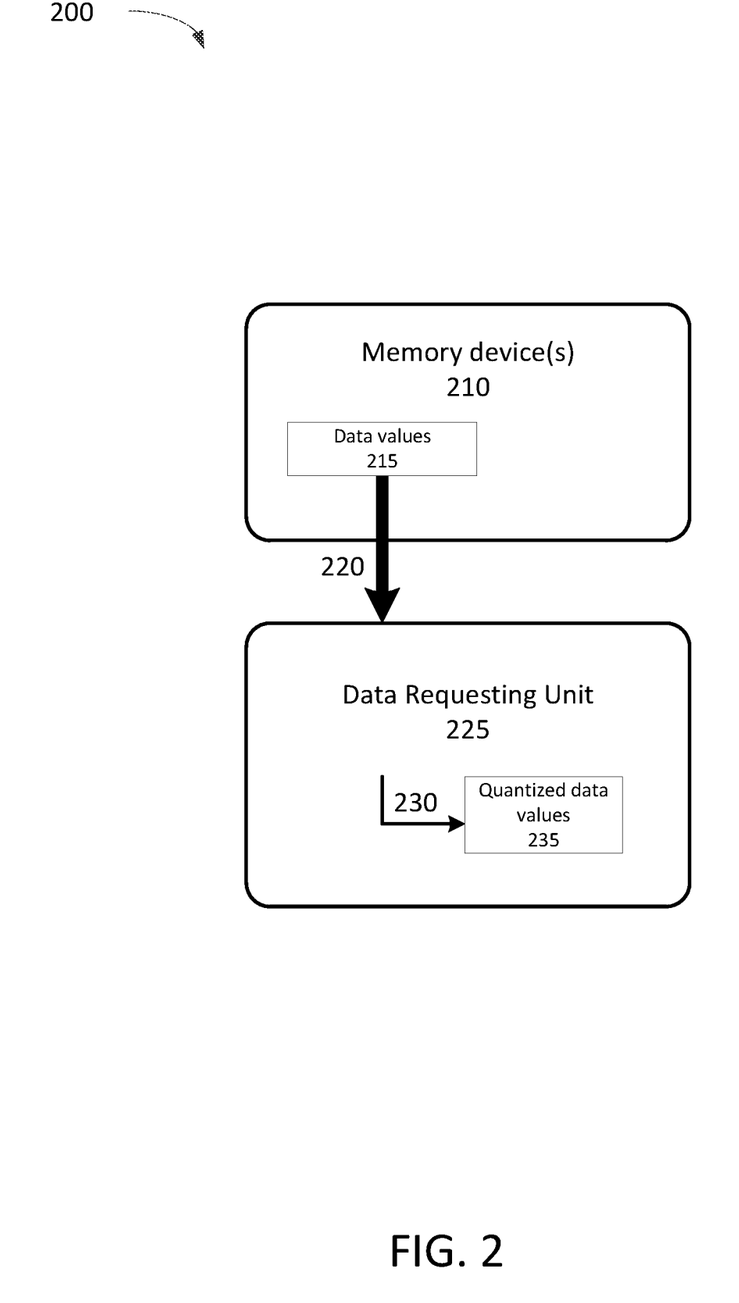
FIG. 2 is a schematic and data flow diagram of an example circuit including a memory device and a data requesting unit.

FIG. 2 shows a schematic and data flow diagram of an example circuit 200 including one or more memory devices 210 storing one or more data values 215. When requested, a data value 215 is sent at full resolution from the memory device 210 to a data requesting unit 225 over connection 220. At 230, the data requesting unit may generate a quantized data value 235 from a data value 215 received from the memory device 210. As illustrated in FIG. 2, the full memory bandwidth of connection 220 may be used each time a quantized data value 235 is needed.

Figure 3:
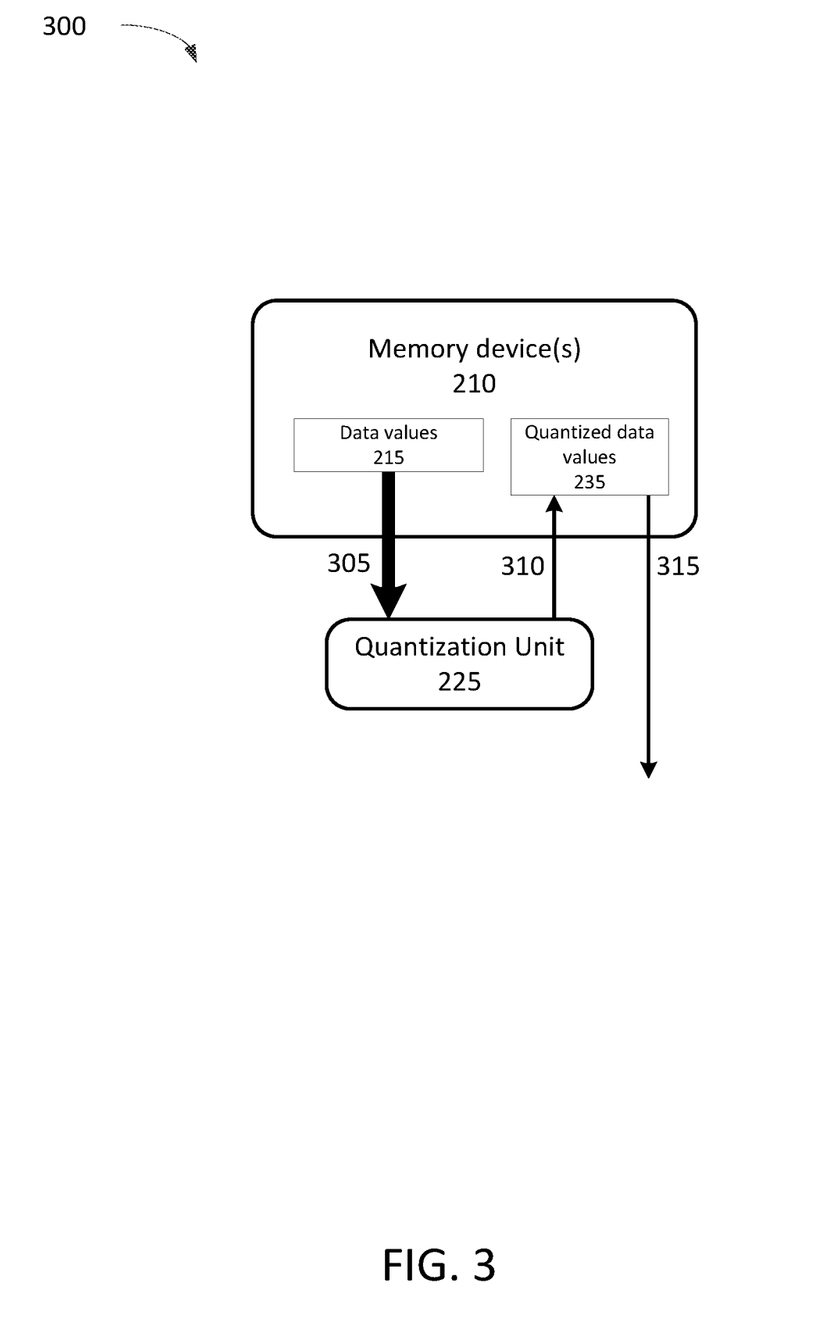
FIG. 3 is a schematic and data flow diagram of an example circuit including a memory device and a quantization unit.

FIG. 3 shows a schematic and data flow diagram of an example circuit 300 including one or more memory devices 210 storing data values 215. At 305, data values 215 are sent at full resolution from the memory device 210 to the quantization unit 225 over a connection. At 310, the quantized data values 235 are sent back for storage in the memory devices 210, and at 315, when required, the quantized data values are subsequently retrieved from the memory devices 210. As illustrated in FIG. 3, sending 310 the quantized data values from the quantization unit 225 to the memory devices 210, and retrieving 315 the quantized data values from the memory devices 210 can utilize less memory bandwidth than the initial retrieval 305 of the data values 215 from the memory device. However, in this example, memory is accessed three times for a particular quantized data value, and additional memory is required to store the quantized data values in the memory devices 210.

Figure 4:
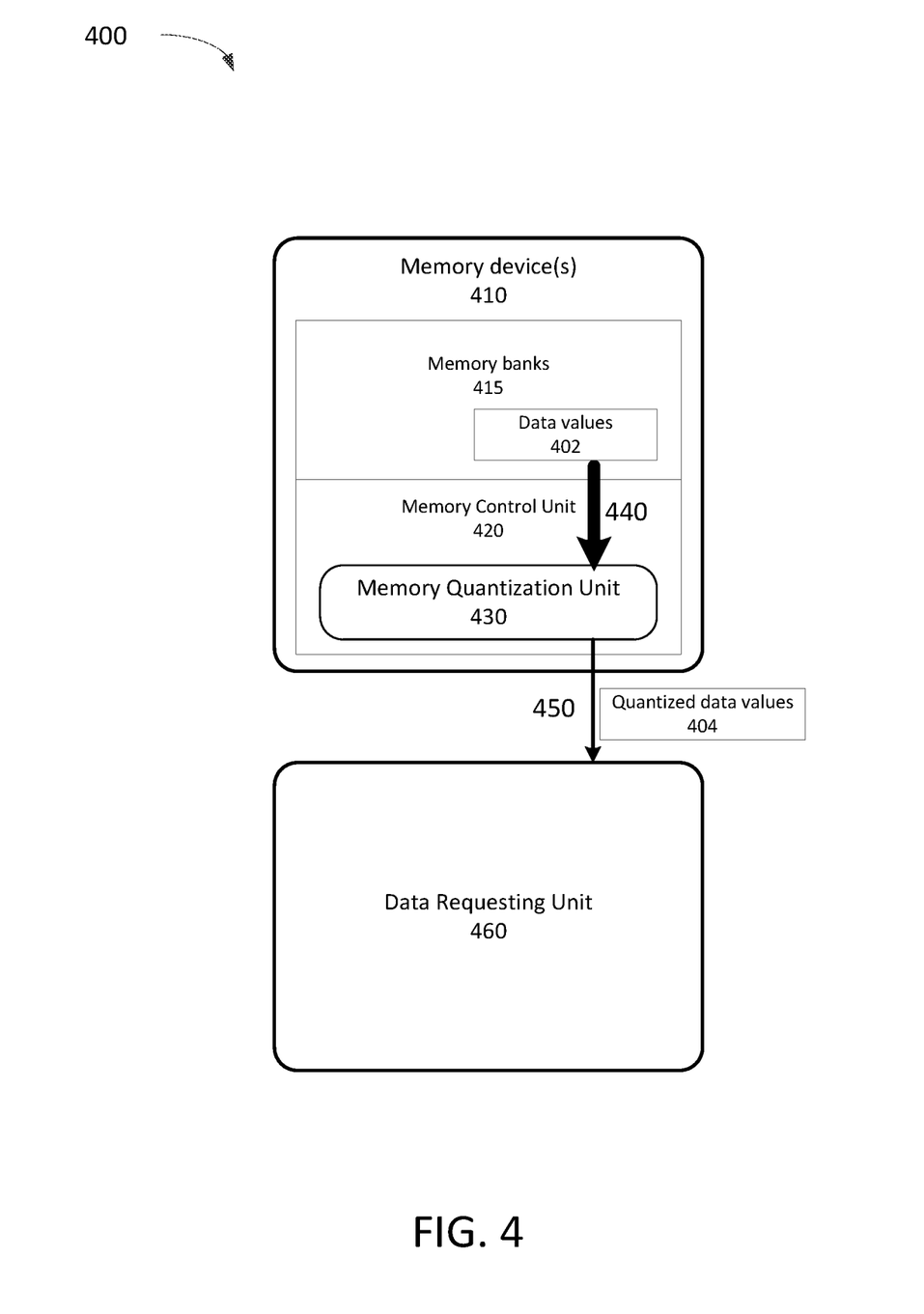
FIG. 4 is a schematic and data flow diagram showing aspects of an example circuit including a memory device and a data requesting unit.

FIG. 4 shows a schematic and data flow diagram showing aspects of an example circuit 400. The circuit 400 can be part of a larger circuit, device or system for a neural network or other data process. The circuit 400 may be implemented with any combination of discrete and/or integrated components. In some embodiments, the circuit 400 can be implemented on a field-programmable gate array (FPGA), an application-specific integrated circuit (ASIC), a printed circuit board (PCB), and/or as part of a larger device/system.

The circuit 400 includes one or more memory devices 410. In some embodiments, the memory devices 410 may be internal/embedded memory blocks, memory logic array blocks, integrated memory devices, on-chip memory, external memory devices, random access memories, block RAMs, registers, flash memories, electrically erasable programmable read-only memory, or any other suitable data storage device(s)/element(s) or combination thereof.

The memory devices 410 can, in some embodiments, include one or more memory banks 415. Each memory bank 415 can include one or more physical or logical memory units for storing data such as data values 402. For example, a memory bank may be a physical memory device, core or circuits, or it may be a partition of one or more physical memory devices, cores or circuits. Any suitable physical and/or logical allocation or combination can be used.

Memory control unit 420 has an interface to an interconnection 440 with the memory banks 415. The interconnection 440 can be one or more serial or parallel links with the memory banks. In some embodiments, the interconnection 440 may include busses, links, lanes, crossbars, row lines, column lines, or any other physical connection or combination thereof. In some embodiments, the interconnection 440 between the memory control unit 420 and the memory banks 415 may include one or more intermediate devices or circuits such as memory controllers, switches, interfaces and the like. The interconnection 440 can, in some instances, provide a connection for data values 402 stored in a memory device 410 to be provided to the memory quantization unit 430.

In some embodiments, the memory control unit 420 can include control and/or computational circuits or devices, processors, controllers, memories, random number generators, caches, buffers and the like. The memory control unit 420 can, in some examples, control and/or manage reading data from and/or writing data to the memory banks 415.

In accordance with some embodiments, the memory control unit 420 is configured to obtain a data value such as a weight value stored in memory via the interconnection 440. As described herein or otherwise, the memory control unit 420 can include or can be configured to instantiate a quantization unit 430. The quantization unit 430 is configured to quantize a data value to generate a quantized data value. In some embodiments, the quantized data value has a shorter bit length than the original data value obtained from memory.

As illustrated in the example in FIG. 4, in some embodiments, the memory control unit 420 can be a portion of or otherwise implemented using a logic layer of a memory device 410. For example, in some embodiments, a memory device 410 can include memory banks 415 for storing data as well as circuitry, devices and/or other processing elements programmable or otherwise configurable to perform one or more operations on data values. In some embodiments, the memory devices 410 can be computational RAM.

In some embodiments, the memory devices 410 can be stacked memory devices such as High Bandwidth Memory (HBM) or Hybrid Memory Cube (HMC) devices. For example, the memory control unit 420 may be configured as part of a logic die of an HBM, or part of vault or other logic layer of an HMC.

In other embodiments, the memory devices 410 can be another suitable memory device including both storage elements and computational elements for implementing a memory quantization unit 430 on the same integrated circuit, device, PCB or package.

The memory control unit 420 can, in some embodiments, include an interface 450 with which it can communicate one or more quantized data values 404 to a data requesting unit 460. The interface 450 can connect the memory control unit 420 to the data requesting unit 460 over busses, links, wires, pins, tracks, pads, or any other physical connection or combination thereof. In some embodiments, the interconnection 450 between the memory control unit 420 and the data requesting unit 460 may include one or more intermediate devices or circuits such as memory controllers, switches, interfaces and the like. The interconnection 440 can, in some instances, provide a connection for data values 402 stored in a memory device 410 to be provided to the memory quantization unit 430.

In some embodiments, the data requesting unit 460 can be an integrated circuit, device, FPGA, or any combination of element(s) configured to request quantized data from the memory devices 410. In some embodiments, the memory devices 410 and the data requesting unit 460 may be part of the same device, integrated circuit, FPGA, etc. In some embodiments, the memory devices 410 and the data requesting unit 460 may be on the same PCB, computational device, package, substrate, and the like.

The data requesting unit 460 can include circuits and/or devices configured to perform one or more data processes. In some data processes, quantized or lower resolution/precision data values may be utilized by the data process than the resolution/precision of the data values stored in memory.

In some embodiments, the data requesting unit 460 can be configured to perform a neural network process such as a neural network training process. In some such embodiments, the data values 402 stored in memory may include weight values for a neural network connection and/or other data utilized for a neural network.

In some embodiments, the memory quantization unit 430 is configured to quantize the data values 402 into binary or ternary quantized data values 404.

In some instances, the data requesting unit 460 may be configured to send instructions or data requests to the memory control unit 420 via the interface 450 or another connection. These instructions can include requests for data and/or requests for quantized data. In some examples, the instructions can include addresses or other information for identifying the data value(s) 402 to be obtained from memory. In some embodiments, the instructions can represent a request to quantize a data value 402 multiple times to generate multiple quantized data values 404.

In some embodiments, the circuit 400 may reduce the bandwidth used between the memory device(s) 410 and the data requesting unit 460 by only communicating the quantized (i.e. lower bit length) data values rather than the full, original-bit length data values. For example, if an original-bit length of a data value 402 is 32 or 64 bits, and the bit length of a quantized data value is one or two bits, the reduction in bandwidth and/or the number of interconnection lines can be significant.

In some embodiments, the interconnection 440 between the memory banks 415 and the interface of the memory control unit 420 may have a high bandwidth. For example, aggregate interconnection speed between memory banks 415 and a memory control unit 420 for a memory device 410 can be hundreds of Gigabytes per second (100+GB/s). In contrast, in some embodiments, the connection 450 between the memory control unit 420 and the data requesting unit 460 may have a lower bandwidth. For example, a connection between an external memory device and an FPGA device may be eight to twenty Gigabytes per second (8-20 GB/s). In some instances, the circuit 400 may benefit from obtaining the original-bit-length data values using the higher bandwidth interconnection between the memory banks 415 and the interface of the memory control unit 420 while reducing or eliminating the potential bottleneck over the connection 450 between the memory control unit 420 and the data requesting unit 460.

In some instances, the potentially lower bandwidth requirements to communicate quantized data values between the connection and interfaces between the memory control unit 420 and the data requesting unit 460 may allow for the connection and/or interfaces to be designed with lower bandwidths thereby potentially reducing cost, area, power, routing challenges, number of connection lines, etc.

In some embodiments, the memory control unit 420 can provide an interface to the data requesting unit 460 that make the memory access and data quantization processes transparent to the data requesting unit. In other words, in some examples, the memory device(s) 410 can be configured to appear in some situations as a regular memory device that can be "read" from to obtain quantized data values.

In some embodiments, removing the quantization process from the data requesting unit can reduce the hardware requirements for an FPGA or other device on which the data requesting unit is implemented.

Figure 5:
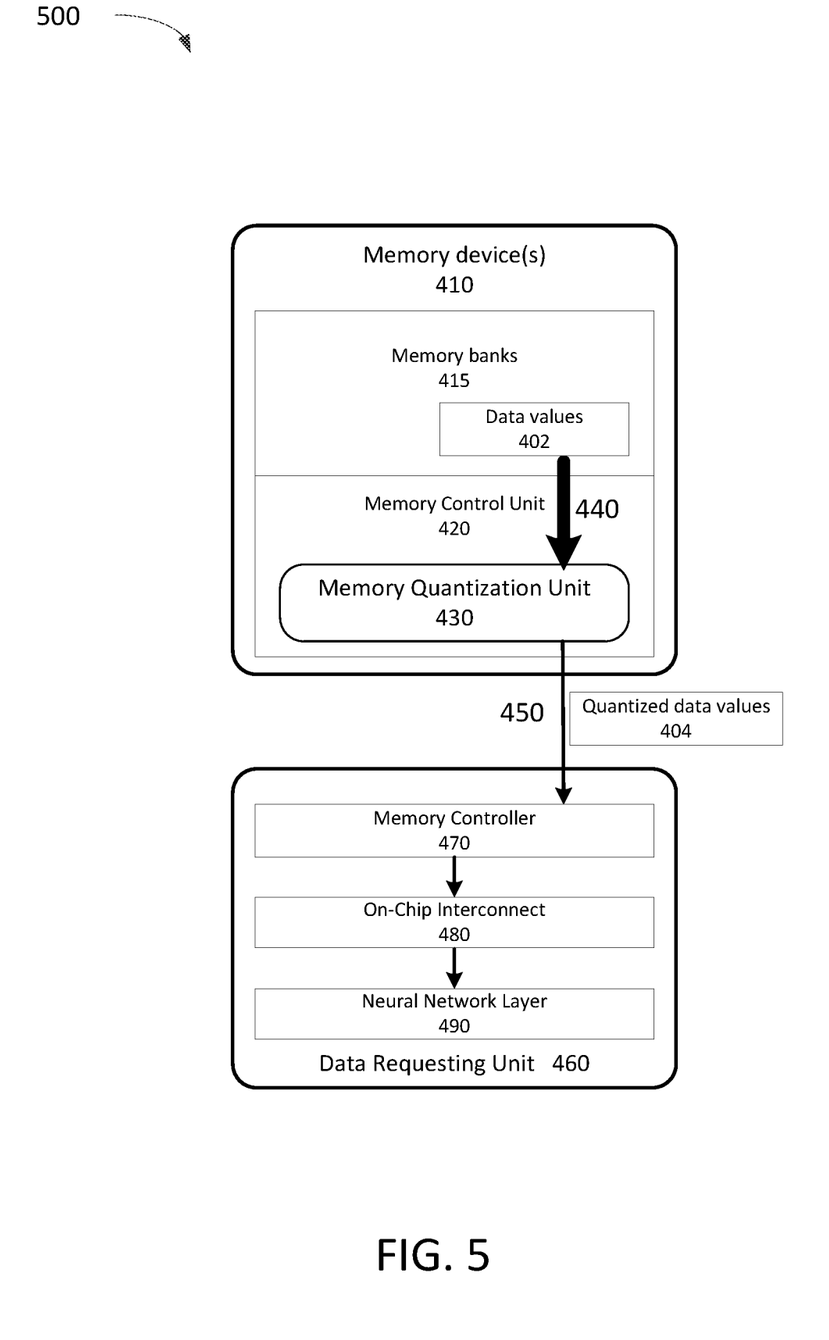
FIG. 5 is a schematic and data flow diagram showing aspects of an example circuit including a memory device and a data requesting unit.

FIG. 5 shows a schematic and data flow diagram showing aspects of an example circuit 500 which is similar to the circuit 400 in FIG. 4. In this circuit 500, the data requesting unit 460 includes its own memory controller 470. The memory controller 470 may be a memory controller for an FPGA, processor, PCB, or any other memory controller for controlling data communications between the data requesting unit 460 and the memory device(s) 410. In some embodiments, the memory controller 470 may be configured to send instructions to obtain data values 402 from the memory device(s) 410 and/or to generate one or more quantized data values 404 from the data values 402.

In some embodiments, the data requesting unit 460 can include on-chip or other interconnects 480 for connecting the memory controller 470 with one or more processing unit(s) such as a neural network layer 490. In some examples, the interconnections 480 may be Advanced eXtensible Interface (AXI) protocol compliant or other suitable interconnections.

In some instances, the lower bit length of the quantized data values reduces the space, power and/or routing required to connect the memory controller 470 with the processing unit(s).

Figure 6:
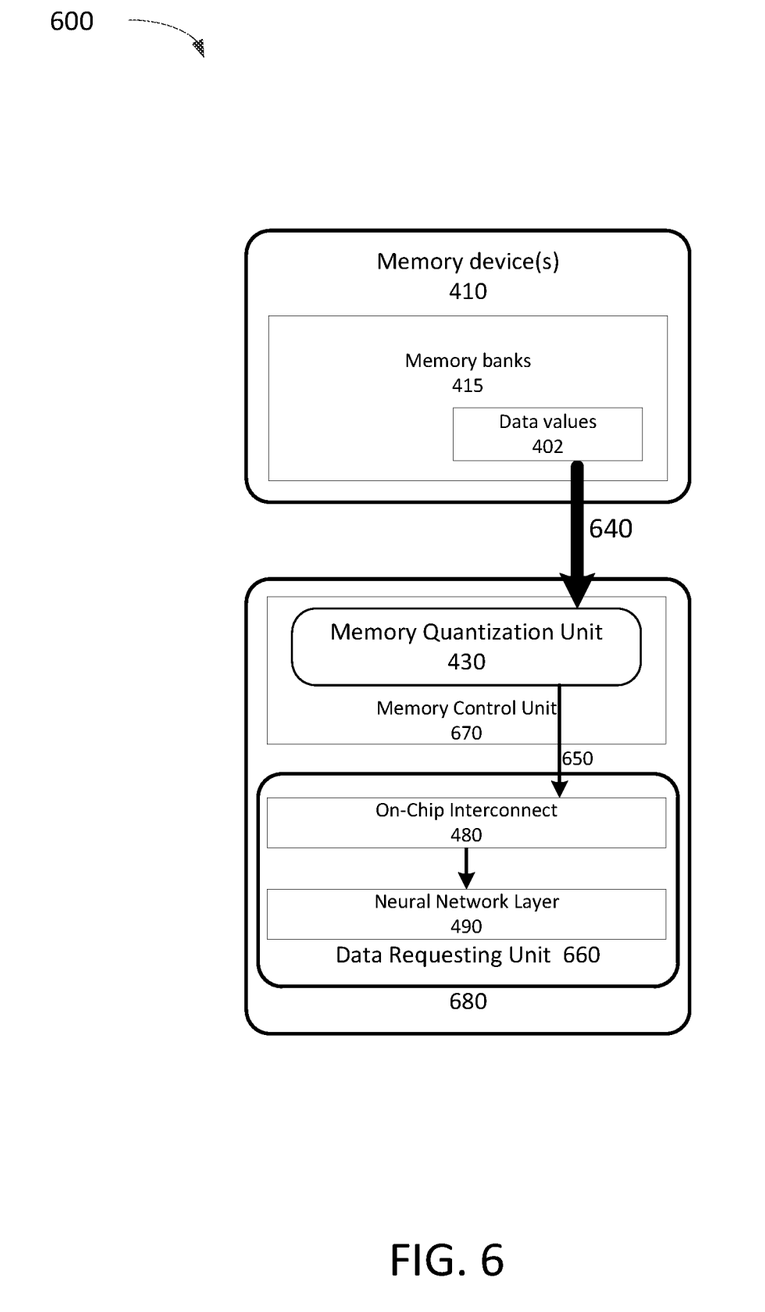
FIG. 6 is a schematic and data flow diagram showing aspects of an example circuit including a memory device and a data requesting unit.

FIG. 6 shows a schematic and data flow diagram showing aspects of another example circuit 600. In this circuit 600, the memory control unit 670 is separate from the memory device(s) 410. For example, the memory control unit 670 may be on an FPGA, PCB and the like. The memory control unit 670 has an interface to an interconnection 640 with the memory banks 415 of the memory devices 410. This interconnection 640 may include control circuitry and/or a control device at the memory device to respond to data requests from the memory control unit 670. The memory control unit 670 also includes a memory quantization unit 430 for quantizing data value(s) 402 obtained from the memory banks 415 to generate quantized weight values as described herein or otherwise.

The memory control unit 670 has an interface to a connection 650 between the memory control unit 670 and the data requesting unit 660.

In this example circuit 600, while the interconnection 640 between the memory device(s) 410 and the memory control unit 670 may require the bandwidth and/or connection width to communicate original bit length data values 402, by including a memory quantization unit 430 close to the interface with the memory device(s) 410, the circuit 600 may, in some instances, lower the required internal bandwidth of the on-chip interconnects 480. This may, in some situations, reduce the size, area, routing challenges and/or power consumption of the on-chip interconnects 480.

Figure 7:
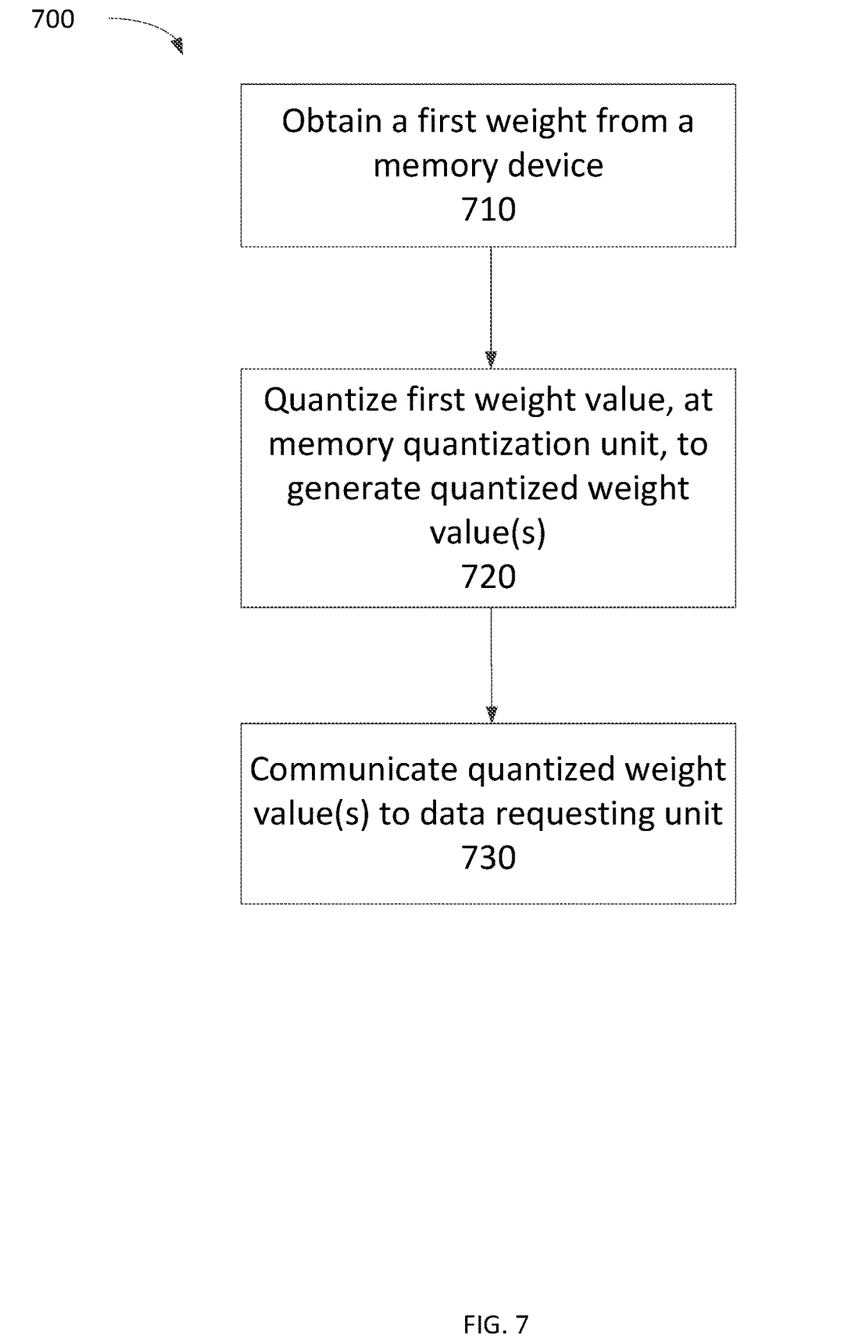
FIG. 7 is a flowchart view of an example method for quantizing data stored in a memory device.

FIG. 7 illustrates a flowchart showing aspects of an example method 700 for quantizing data stored in a memory device. At 710, upon receiving, at a memory control unit 420, 670, a quantized data request, the memory control unit obtains a first data value such as a weight value from a memory device.

At 720, a memory quantization unit 430 quantizes the first data value to generate one or more quantized data values such as a quantized weight value.

In some embodiments, quantizing the first data value includes a deterministic process to determine a quantization level for the first data value. For example, when the memory quantization unit is configured to quantize the data value into a binary value (e.g. +1 or −1), the quantization process may be based on the formula:

$$w_b = \begin{cases} +1 & \text{if } w \geq 0, \\ -1 & \text{otherwise} \end{cases}.$$

In this example, the quantization levels are +1 and −1, the first data value is w and the quantized data value is $w_b$. In some embodiments, the quantized data values selected from the quantization levels of +1 or −1 can be represented by a single bit which may, in some instances, be communicated over a single-bit line.

In other examples, the memory quantization unit may be configured to quantize the data value in to a ternary value (e.g. +1, 0, or −1) which can be represented by two bits, or to a data value having any number of bits and representing any number of quantization levels.

In some examples, the memory quantization unit may be configured to quantize the data by checking a sign bit, rounding, shifting, truncating and/or any other logical or computational operation based on the deterministic process.

In some embodiments, quantizing the first data value includes a stochastic process for selecting a quantization level from two or more quantization levels.

For example, when the memory quantization unit is configured to quantize the data value into a binary value (e.g. +1 or −1), the quantization process may be based on the formula:

$$w_b = \begin{cases} +1 & \text{with probability } p = \sigma(w), \\ -1 & \text{with probability } 1 - p \end{cases}$$

where σ is the hard sigmoid function:

$$\sigma(w) = \text{clip}\left(\frac{w+1}{2}, 0, 1\right) = \max\left(0, \min\left(1, \frac{w+1}{2}\right)\right).$$

In some embodiments, the memory quantization unit may include a random number generator, and/or a cache or other storage to implement the quantization process.

At 730, the memory control unit communicates one or more quantized data values to the data requesting unit.

Figure 8:
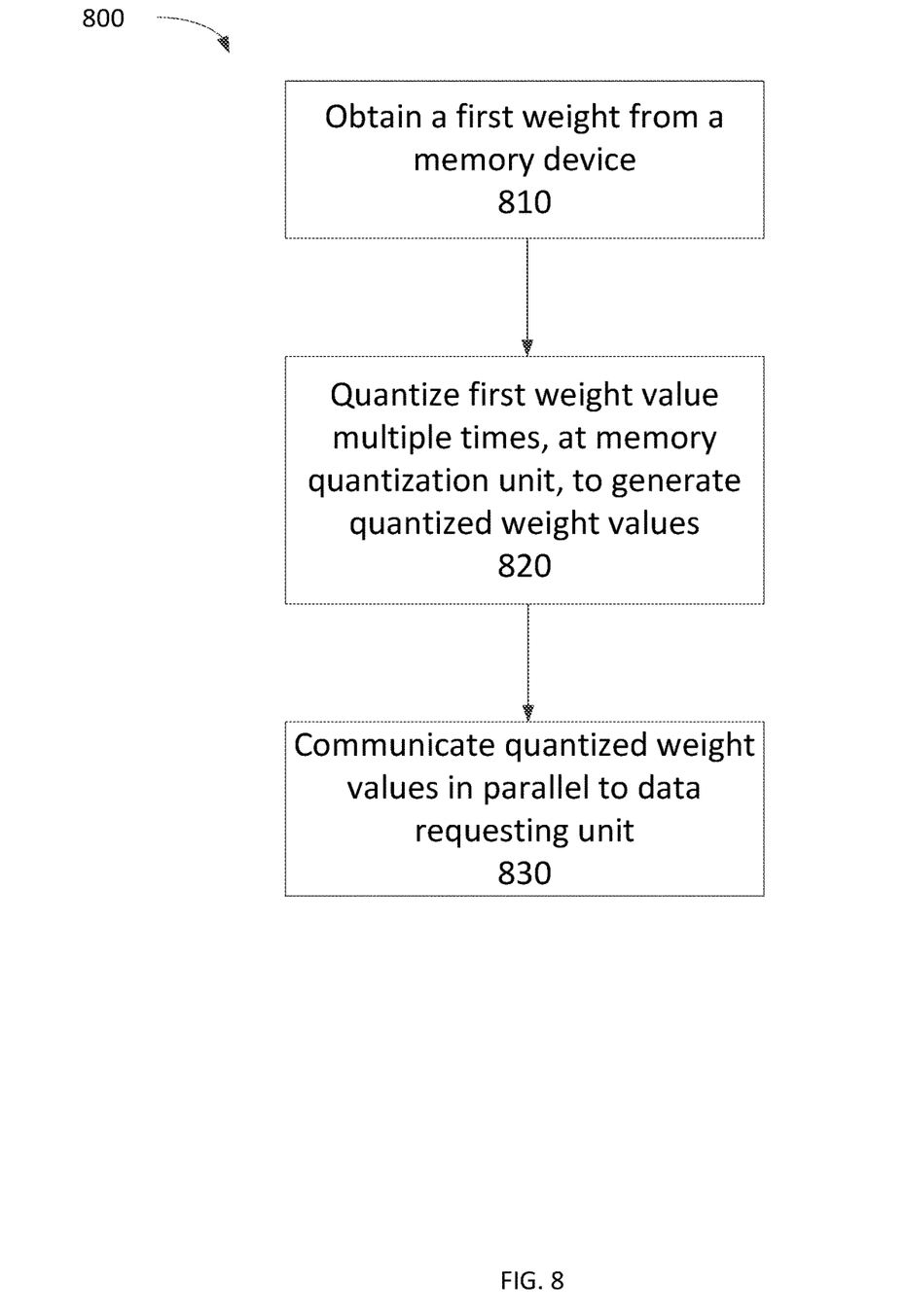
FIG. 8 is a flowchart view of an example method for quantizing data stored in a memory device.

FIG. 8 illustrates a flowchart showing aspects of an example method 800 for quantizing data stored in a memory device. This method 800 is similar to the method 700 of FIG. 7 except that at 820, the memory quantization unit is configured to quantize the first data value obtained from memory multiple times as described herein or otherwise. This generates multiple quantized weight values which can, in some instances, be used by the data requesting unit at different times/places/situations where a quantized data value based on the original bit-length data value is to be used.

The memory control unit can, in some embodiments, buffer, cache or otherwise store the quantized data values until they are communicated to the data requesting unit at 830.

In some embodiments, the memory control unit can communicate the quantized weight values in parallel to the data requesting unit. For example, if a connection between the memory control unit and the data requesting unit is 32-bits wide, the memory control unit may send 32 single-bit quantized data values in a single 32-bit word communication.

In some examples, this can maximize the use of the bandwidth of the connection between the memory control unit and the data requesting unit. For example, with reference to the example circuit 400 in FIG. 4, if the connection 450 between the memory devices 410 and the data requesting unit 460 is 32-bits wide, sending 32 single-bit quantized data values at once potentially eliminates wasting 31-bits of the data connection with every communication.

In some examples, the first data value can be read only once to generate multiple quantized data values which can, in some instances, reduce the number of memory read transactions from the memory device/banks.

In some instances, some embodiments of the systems, devices, methods, and circuits may reduce power, improve performance and/or reduce costs relative to other architectures.

Aspects of some embodiments may provide a technical solution embodied in the form of a software product. Systems and methods of the described embodiments may be capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Various example embodiments are described herein. Although each embodiment represents a single combination of inventive elements, all possible combinations of the disclosed elements are considered to the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hardware memory control unit of a memory device, comprising:
   a first interface to an interconnection between the hardware memory control unit and at least one memory bank of the memory device;
   a second interface for communicating between the hardware memory control unit and a hardware data requesting unit; and
   a hardware memory quantization unit between the at least one memory bank and the hardware data requesting unit, the hardware memory quantization unit integrated within the hardware memory control unit, the first interlace having a higher bandwidth than the second interface, and the hardware memory quantization unit configured to:
      retrieve, via the first interlace, a first weight value from the at least one memory bank, the first weight value having a first bit length; and
      quantize the first weight value to generate at least one quantized weight value having a second bit length, the second bit length being shorter than the first bit length; and
      communicate the at least one quantized weight value to the hardware data requesting unit via the second interlace for the hardware data requesting unit to perform a neural network operation using the at least one quantized weight value.

2. The hardware memory control unit of claim 1 wherein the hardware memory quantization unit is configured to quantize the first weight value using a deterministic process to determine a quantization level for the first weight value to generate the at least one quantized weight value.

3. The hardware memory control unit of claim 1 wherein the hardware memory quantization unit is configured to quantize the first weight value using a stochastic process for selecting a quantization level from a plurality of quantization levels based on the first weight value to generate the at least one quantized weight value.

4. The hardware memory control unit of claim 1 wherein the hardware memory quantization unit is configured to quantize the first weight value multiple times to generate a plurality of quantized weight values; and communicate the plurality of quantized weight values in parallel to the hardware data requesting unit via the second interlace.

5. The hardware memory control unit of claim 1 wherein the first weight value represents a weight for a connection of a neural network.

6. The hardware memory control unit of claim 1 wherein the at least one quantized weight value has the second bit length of one bit or two bits.

7. The hardware memory control unit of claim 1 wherein the hardware memory control unit is at least a portion of a logic layer of the memory device.

8. The hardware memory control unit of claim 1 wherein the hardware memory control unit comprises a portion of a stacked memory device.

9. The hardware memory control unit of claim 1, wherein the first weight value is one of a plurality of weight values, each of the plurality of weight values associated with a layer of a neural network, and the hardware memory quantization unit communicates the at least one quantized weight value for the hardware data requesting unit to perform the neural network operation for the layer of the neural network.

10. A method for quantizing data stored in a memory device, the method comprising:
    upon receiving, at a hardware memory control unit of the memory device, a quantized data request, retrieving, via a first interface to an interconnection between the hardware memory control unit and at least one memory bank, a first weight value from the at least one memory bank of the memory device, the first weight value having a first bit length;
    quantizing, with a hardware memory quantization unit integrated within the hardware memory control unit, the first weight value to generate at least one quantized weight value having a second bit length, the second bit length being shorter than the first bit length a shorter bit length than a bit length of the first weight value; and
    communicating the at least one quantized weight value to a hardware data requesting unit via a second interlace for communicating between the hardware memory control unit and the hardware data requesting unit to perform a neural network operation using the at least one quantized weight value, wherein the hardware memory quantization unit is between the at least one memory bank and the hardware data requesting unit, and wherein the first interface has a higher bandwidth than the second interface.

11. The method of claim 10 wherein the quantizing the first weight value comprises a deterministic process to determine a quantization level for the first weight value to generate the at least one quantized weight value.

12. The method of claim 10 wherein the quantizing the first weight value comprises a stochastic process for selecting a quantization level from a plurality of quantization levels based on the first weight value to generate the at least one quantized weight value.

13. The method of claim 10 further comprising:
    quantizing the first weight value multiple times to generate a plurality of quantized weight values; and communicating the plurality of quantized weight values in parallel to the hardware data requesting unit via the second interface.

14. The method of claim 10 wherein the at least one quantized weight value has the second bit length of one bit or two bits.

15. The method of claim 10 wherein the first weight value represents a weight for a connection of a neural network.

16. A circuit comprising:
a hardware memory control unit including a first interface to an interconnection between the hardware memory control unit and at least one memory bank;
a second interface for communicating between the hardware memory control unit and a hardware data requesting unit; and
a hardware memory quantization unit between the at least one memory bank and the hardware data requesting unit, the hardware memory quantization unit integrated within the hardware memory control unit, the first interface having a higher bandwidth than the second interlace and configured to:
obtain, via the first interface, a first weight value having a first bit length from the at least one memory bank;
quantize the first weight value to generate at least one quantized weight value having a second bit length, the second bit length being shorter than the first bit length; and
communicate the at least one quantized weight value to the hardware data requesting unit via the second interlace for the hardware data requesting unit to perform a neural network operation using the at least one quantized weight value.

17. The circuit of claim 16 wherein the hardware memory quantization unit is configured to quantize the first weight value using a deterministic process to determine a quantization level for the first weight value to generate the at least one quantized weight value.

18. The circuit of claim 16 wherein the hardware memory quantization unit is configured to quantize the first weight value using a stochastic process for selecting a quantization level from a plurality of quantization levels based on the first weight value to generate the at least one quantized weight value.

19. The circuit of claim 16 wherein the hardware memory quantization unit is configured to quantize the first weight value multiple times to generate a plurality of quantized weight values; and communicate the plurality of quantized weight values in parallel to the hardware data requesting unit via the second interface.

20. The circuit of claim 16 comprising a memory device, wherein the hardware memory control unit is at least a portion of a logic layer of the memory device.

21. The circuit of claim 16 comprising the hardware data requesting unit, the hardware data requesting unit including a neural network architecture, wherein the first weight value represents a weight for a connection of the neural network architecture.

* * * * *

UNITED STATES PATENT AND TRADEMARK OFFICE
CERTIFICATE OF CORRECTION

PATENT NO. : 10,643,126 B2
APPLICATION NO. : 15/210164
DATED : May 5, 2020
INVENTOR(S) : Manuel Saldana et al.

Page 1 of 1

It is certified that error appears in the above-identified patent and that said Letters Patent is hereby corrected as shown below:

In the Claims

In Column 9, Line 36, Claim 1, delete "interlace" and insert --interface--.

In Column 9, Line 39, Claim 1, delete "interlace" and insert --interface--.

In Column 9, Line 41, Claim 1, delete "and".

In Column 9, Line 48, Claim 1, delete "interlace" and insert --interface--.

In Column 9, Line 67, Claim 4, delete "interlace" and insert --interface--.

In Column 10, Line 38, Claim 10, delete "interlace" and insert --interface--.

In Column 11, Line 13, Claim 16, delete "interlace" and insert --interface--.

In Column 11, Line 21, Claim 16, delete "interlace" and insert --interface--.

Signed and Sealed this
Eleventh Day of August, 2020

Andrei Iancu
*Director of the United States Patent and Trademark Office*